(12) United States Patent
Caron

(10) Patent No.: US 6,753,658 B2
(45) Date of Patent: Jun. 22, 2004

(54) ELECTRONIC BALLAST CIRCUIT FOR OPERATING A HIGH INTENSITY DISCHARGE LAMP

(75) Inventor: Donald Caron, Windham, NH (US)

(73) Assignee: Osram Sylvania, Inc., Danvers, MA (US)

( * ) Notice: Subject to any disclaimer, the term of this patent is extended or adjusted under 35 U.S.C. 154(b) by 0 days.

(21) Appl. No.: 10/181,972

(22) PCT Filed: Jan. 24, 2001

(86) PCT No.: PCT/US01/02234
§ 371 (c)(1),
(2), (4) Date: Oct. 7, 2002

(87) PCT Pub. No.: WO01/54461
PCT Pub. Date: Jul. 26, 2001

(65) Prior Publication Data
US 2003/0222598 A1 Dec. 4, 2003

Related U.S. Application Data
(60) Provisional application No. 60/178,005, filed on Jan. 24, 2000.

(51) Int. Cl.[7] .............................................. H05B 37/02
(52) U.S. Cl. ..................... 315/209 R; 315/291; 315/307
(58) Field of Search ............................ 315/209 R, 212, 315/291, 279, 282, 224, 209 T, 209 CD, 225, 297, 307; H05B 37/02

(56) References Cited

U.S. PATENT DOCUMENTS

| | | | |
|---|---|---|---|
| 4,873,617 A | 10/1989 | Frederick et al. | 363/17 |
| 5,434,474 A | 7/1995 | Ukita et al. | 315/128 |
| 5,514,935 A * | 5/1996 | Oda et al. | 315/82 |
| 5,519,286 A | 5/1996 | Rodrigues et al. | 313/159 |
| 5,608,294 A | 3/1997 | Derra et al. | 315/224 |
| 5,805,020 A | 9/1998 | Danz et al. | 330/10 |
| 5,821,701 A * | 10/1998 | Teggatz et al. | 315/307 |
| 5,844,374 A | 12/1998 | Ettes et al. | 315/209 R |
| 5,861,719 A | 1/1999 | Koskowich et al. | 315/209 R |
| 5,932,976 A * | 8/1999 | Maheshwari et al. | 315/291 |
| 5,939,834 A | 8/1999 | Nerone | 315/209 R |
| 6,008,594 A * | 12/1999 | Kita et al. | 315/307 |
| 6,034,489 A | 3/2000 | Weng | 315/307 |
| 6,046,551 A | 4/2000 | Kita | 315/307 |

* cited by examiner

Primary Examiner—Don Wong
Assistant Examiner—Trinh Vo Dinh
(74) Attorney, Agent, or Firm—Carlo S. Bessone

(57) ABSTRACT

An electronic ballast circuit (FIG. 1) includes a voltage-regulated DC power source and an H-bridge having a plurality of transistors (Q5, Q6, Q7, Q8). The circuit operates a high intensity discharge lamp (50). A regulating circuit electrically connected to the transistors regulates the peak current flowing through the H-bridge by discharging a parasitic capacitance (C parasitic).

14 Claims, 1 Drawing Sheet

ELECTRONIC BALLAST CIRCUIT FOR OPERATING A HIGH INTENSITY DISCHARGE LAMP

This application claims priority to Provisional Application S/No. 60/178,005 filed on Jan. 24, 2000.

TECHNICAL FIELD

The present invention relates to an electronic ballast circuit and a method of operating the circuit. The electronic circuit detects and limits peak current surge, specifically peak current surge through a high intensity discharge (HID) lamp.

BACKGROUND AND RELATED ART

An inrush of current occurs after ignition of a typical D1 HID lamp. This current nominally has a peak of 30 A. A lamp of this type, like any lamp used in automotive HID circuitry, uses an H-bridge, or Full Bridge, as a switching circuit to provide AC current to the lamp. The 30 A surge can cause unreliable operation of the H-bridge control circuitry, or failure of the H-bridge MOSFET switches.

Handling high current through an electronic ballast circuitry can be accomplished in a variety of ways. One way is to utilize components, such as MOSFETs, that are rated at a given current level that is as high or higher than the maximum current through the system. One drawback of using components having a high current rating is that they are more expensive. Also, the higher rated components tend to be larger and heavier than their lower rated counterparts. In most applications, the space occupied by the components and the weight of the components should be kept to a minimum.

A second way of handling the excess current is to install a component that provides for controlled inrush of "ON" current. Such components include, but are not limited to, a thyristor or pair of thyristors in an active filter-voltage step-up circuit as disclosed in U.S. Pat. No. 5,719,473 to Huber et al; an output stage designed as a step-up regulator or a blocking oscillator as disclosed in U.S. Pat. No. 5,877,614 to Huber; an oscillatory transformer as disclosed in U.S. Pat. No. 6,078,144 to Twardzik; a multivibrator with hysteresis as disclosed in EP0 757,420; or an inductor of sufficient volt-second capability. The inductor would normally be placed in series with the lamp to limit the peak current. Installing any of these components increases the overall size, complexity and cost of the system.

SUMMARY OF THE INVENTION

It is an object of the present invention to utilize an existing lower rated MOSFET in an H-bridge circuit to limit current flowing therethrough.

Another object of the present invention is to reduce the gate voltage of a MOSFET in an H-bridge during the period following lamp ignition to limit current flowing through the MOSFET.

A further object of the present invention is to provide a method for limiting the current through the MOSFET using parasitic capacitance.

The present invention achieves these and other objects by using at least one of the existing H-bridge MOSFET switches to limit the D1 lamp surge current to a level that is within the rating of the existing devices. The present invention makes use of a parasitic capacitance that is created by operating the circuit in the preferred embodiment. Drawing voltage from one of the resistors in the circuit in order to discharge the parasitic capacitance reduces the voltage at the gate of the MOSFET. The gate then partially closes and the current across the MOSFET is then limited. An advantage of using this approach is that by detecting and limiting the surge, the addition of external components or costly oversized switching MOSFETs can be avoided.

BRIEF DESCRIPTION OF THE DRAWINGS

This invention may be clearly understood by reference to the attached drawing which shows an electronic ballast circuit for an HID lamp according to a preferred embodiment of the invention.

DESCRIPTION OF THE PREFERRED EMBODIMENTS

Figure 1:
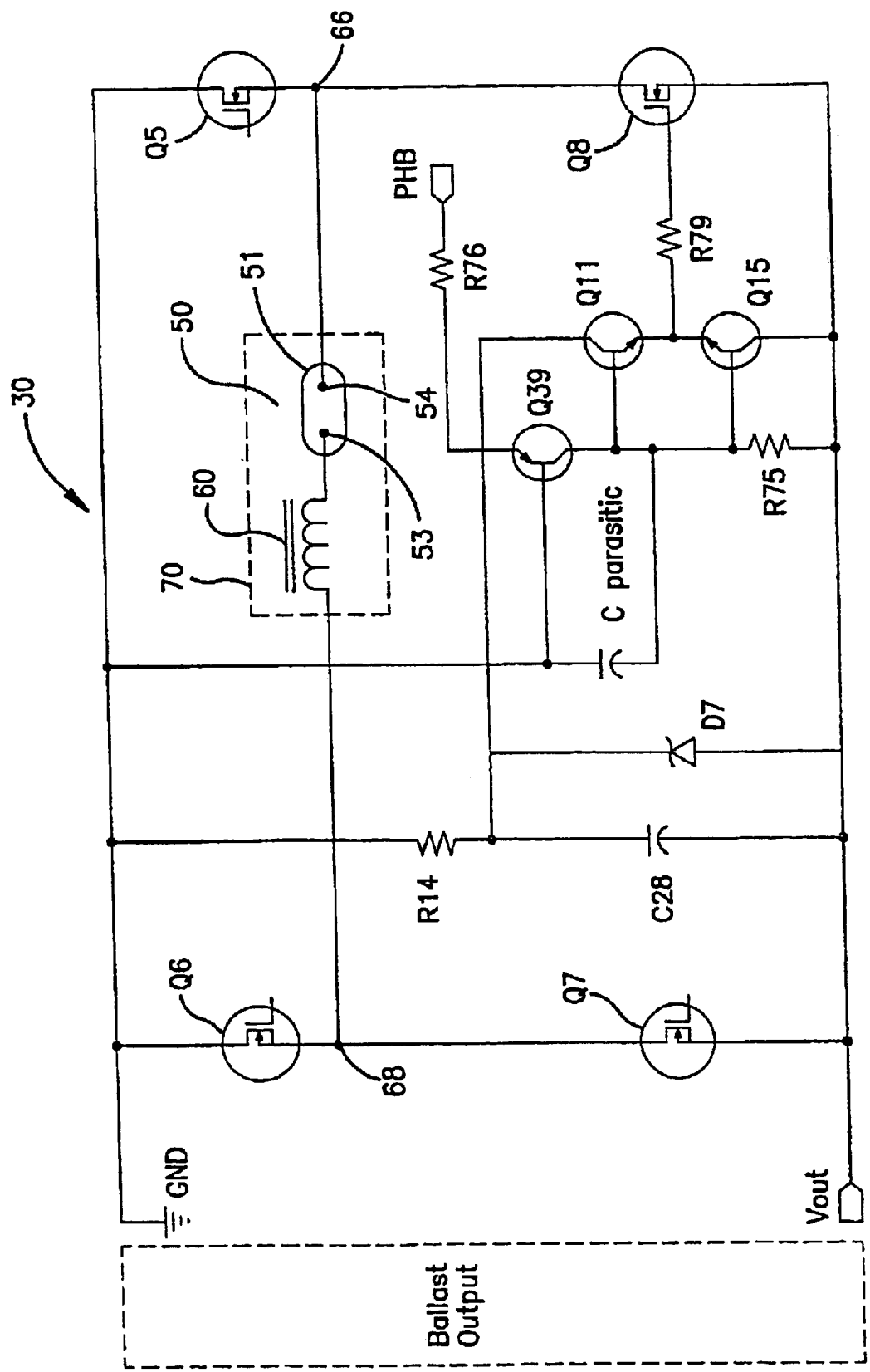

For a better understanding of the present invention, together with other and further objects, advantages and capabilities thereof, reference is made to the disclosure and accompanying claims taken in conjunction with the above-described drawing.

The preferred embodiment of this invention is illustrated in the drawing. In this embodiment, a lamp 50 is an automotive D1 HID lamp. The lamp 50 may be integral with an igniter transformer 60. The lamp 50 and the transformer 60, are represented by the circuit inside the dashed box 70.

The output of a ballast provides a DC voltage that is fed to an H-bridge switching circuit 30. Any such ballast with appropriate modulation may be used. The output of the H-bridge 30 has a squarewave voltage with a frequency of approximately 500 Hz. The components of the H-bridge and the operation are described below.

The discharge lamp 50 includes a conventional sealed arc tube 51 that defines a discharge space therein. The arc tube 51 may be transparent or translucent, as desired. A mercury free halide fill is included within the discharge space in a conventional manner.

The discharge lamp 50 includes two electrodes sealed therein for establishing an arc discharge. For example, the arc tube 51 comprises two electrodes 53 and 54 sealed therein at opposite ends in a conventional manner. Electrode 54 is electrically connected to a connector 66 and electrode 53 is electrically connected to transformer 60 which is in turn electrically connected to connector 68 thereby electrically connecting the arc tube 51 to the H-bridge switching circuit 30.

The H-bridge switching circuit 30 contains four MOSFETs; two low-side MOSFETs Q5 and Q6 and two high-side MOSFETs Q7 and Q8. During steady state operation, the circuit alternates between Q6,Q8 ON, Q5,Q7 OFF and Q6,Q8 OFF, Q5,Q7 ON. Since the invention relates to the time up to and immediately following ignition, the circuitry will only be described in relation to Q6 and Q8, particularly the detection and control circuitry connected to the gate of Q8.

Q6 and Q8 are held ON prior to, during and immediately after ignition. The drive source, phase B (PHB) for Q8 is a switched DC source, i.e., the drive source cycles between −85 volts and ground, and has a frequency of about 500 Hz. The drive source (PHA) (not shown) for Q7 operates in the same manner. The two drive sources (PHB, PHA) are 180 degrees out of phase and operate at about 50% power.

The drawing illustrates an embodiment of a gate drive (controlling) circuit for an isolated gate device Q8 constructed according to the present invention. In this embodiment, the isolated gate device Q8 is an MOSFET. Those skilled in the art will understand, however, that the gate drive circuit may also be used to drive other FETs, IGBTs and MCTs. Of course, one gate drive circuit may drive one or multiple isolated gate devices Q.

The gate drive circuit includes an energy storage capacitor C28 connected to the high side of the ballast voltage output Vout and coupled in series to a resistor R14 that is in turn coupled to the low side of the power source. C28 is also coupled in parallel to a zener diode D7. Of course, in other embodiments, the diode D7 may not be a zener diode. C28, R14 and D7 together form a regulated supply for transistor Q11. Q11 and transistor Q15 are in a totem-pole configuration connected between the C28/R14 connection and the high side of the power source as shown in FIG. 1. In the illustrated embodiment, the totem-pole configuration consists of an npn transistor Q11 serially-coupled to a first pnp transistor Q15. A transistor R79 is between the emitters of Q11/Q15 and the gate of Q8.

A second pnp transistor Q39 acts as a current source to maintain 10VDC across resistor R75. R75 is connected to the high side of the power source and is used for static protection and to pull down the gate of Q8 and thus turn OFF MOSFET Q8. Thus, Q39 and resistor R75 form a level shifting circuit. Those skilled in the art will realize, however, that the use of any driver circuit or device is well within the broad scope of the present invention.

The gate drive circuit further includes resistor R76 serially coupled between a drive signal phase (PHB) and the emitter of Q39. PHB turns isolated gate device Q8 ON and OFF. As disclosed above, PHB operates 180° out of phase from a second drive signal PHA that controls Q7.

The drive voltage Vb from drive signal phase PHB drives the gate of Q8 to turn ON the isolated gate device Q8. The voltage required to maintain Q8 in a fully ON state is between 5V and 8V. This voltage is approximately equal to the voltage drop across R75 minus the voltage drop across the base to emitter junction of Q11.

Due to the circuitry configuration as described above, a parasitic capacitance (C parasitic) occurs between the base and the collector of Q39. Those having ordinary skill in the art would normally not want the circuit configured in this manner because the occurrence of C parasitic slows the switching speed of the circuit. However, the present invention includes the previously unknown technique of using C parasitic to reduce the peak current seen by the MOSFETs as described below.

In order to reduce the peak current seen by Q8, the current in the H-bridge needs to be reduced. This current reduction is accomplished by discharging C parasitic. The current to discharge C parasitic comes from Q39. Since the discharge current is from the same current source (Q39) used to maintain 10 VDC across R75, the current through R75 is necessarily reduced. When the current through R75 is reduced, the voltage drop across R75 is proportionately reduced. As stated above, the voltage at the gate of Q8 is approximately the voltage drop across R75 minus the voltage drop across the base-to-emitter junction of Q11. Therefore, reducing the voltage across R75 corresponds to a voltage reduction at the gate of Q8. The voltage at the gate of Q8 goes down to between 2 V-4 V. This voltage drop increases the impedance through the MOSFET channel, reducing the maximum current through Q8 to about 20 Amps.

The lamp 50 is initially OFF and remains OFF until the voltage at the secondary side of the transformer 60 is sufficient to ignite the lamp 50. The ballast normally outputs approximately −400VDC. During ignition another approximately −600VDC is outputted and added to the primary side of the transformer 60. The combined approximate −1000VD is presented to the primary side of the transformer 60. The secondary side of the transformer 60 has an output voltage of about 23,000 V, which is sufficient to ignite the lamp.

The ignition sequence is from zero to five microseconds in duration. Upon ignition, the lamp 50 begins to "glow", but is not yet "arcing". Therefore the current is not yet flowing and there is a very high, nearly infinite resistance. The lamp needs to be "arcing" to allow current to flow. The about −400VDC across Vout supplies the energy to initiate current flow and establish "arcing". Once the lamp is "arcing", the resistance of the lamp drops to about 10 ohms and a surge of current begins flowing through the circuit. In a time span of approximately 13 microseconds, the current changes from zero to a maximum of about 20 Amps due to the operation of the control circuit as described above.

As the current increases toward its peak value, the about −400VDC at Vout decreases toward zero volts. This resultant voltage drop creates a charge capacitance, C parasitic, due to the configuration of the circuitry as stated above. Since transistor Q39 maintains 10VDC across resistor R75, the voltage initially across C parasitic would be −390VDC. This voltage is also decreasing toward zero volts with the increase in current.

C parasitic has been charged so that the positive side is at ground and the negative side is at the upper terminal of R75. For C parasitic to discharge, current has to flow through C parasitic from the R75 side to the ground side of C parasitic. The current used to discharge C parasitic comes from Q39. Since this current would normally be used to maintain the 10VDC across R75, by using some of the current to discharge C parasitic, the current through and hence the voltage across R75, is reduced. As a result, the voltage at the gate of Q8 goes down to between 2 to 4 V. Reducing the voltage at the gate of Q8 increases the impedance of Q8 and the resulting voltage drop at the gate of Q8 results in a drain to source voltage increase from 0 to 150 V, which limits the lamp peak current to 20 A, which is smaller than the 30A normally found in such devices. This means that the MOSFETs, and thus the device, can be smaller.

The current limiting occurs during the first phase B cycle. Once the lamp reaches a steady state, phase B and phase A alternate so that either Q6 and Q8 are ON, or Q5 and Q7 are ON. The voltage through the system is maintained so that raw lamp power consumption is 35 watts. 35 watts of power translates into a nominal Vout of approximately 85 volts, although the voltage may be anywhere in the range of 60 to 100 volts.

The circuit could be reconfigured to force the circuit to operate in the opposite direction, wherein the peak limiting occurs during the first phase A cycle. External circuitry can be added and the microprocessor controlling the main power output can also be used to force the circuit to operate in the opposite direction.

The embodiment that has been described herein is set forth here by way of illustration, but not of limitation. It is apparent that other embodiments that will be readily apparent to those skilled in the art may be made without departing materially from the spirit and scope of this invention.

I claim:

1. An electronic ballast circuit comprising: a voltage-regulated DC power source; an H-bridge comprising a plurality of H-bridge transistors, said H-bridge being electrically connected to said power source; a lamp socket connected to said H-bridge; and a regulating circuit electrically connected to at least one of said H-bridge transistors so as to regulate a peak current flowing through said H-bridge, an igniter transformer mounted in series with a discharge lamp and connected to said H-bridge between said plurality of H-bridge transistors, said plurality of H-bridge transistors comprising: a first transistor between a low side of said power source and a first terminal of said lamp, a second opposite terminal of said lamp being electrically connected to a first terminal of said igniter transformer; a second transistor between a second terminal of said igniter transformer and the low side of said power source, a third transistor between a high side of said power source and the second terminal of said igniter; a fourth transistor between the high side of said power source and the first terminal of said lamp, said fourth transistor being electrically connected to said regulating circuit, said regulating circuit including a drive signal output; a bias resistor electrically connected to said high side of said power source; a current source transistor having a base electrically connected to said low side of said power source, a collector electrically connected to said bias resistor and an emitter electrically connected to said drive signal output; a first gate drive transistor and a second sate drive transistor, each having a base connected to said bias resistor; and said fourth transistor being electrically connected to the emitter of said first sate drive transistor, wherein a base and a collector of said current source transistor being connected so that a parasitic capacitance exists therebetween.

2. The ballast circuit of claim 1 wherein said transistors are MOSFETs.

3. The ballast circuit of claim 1 wherein said discharge lamp is a high intensity discharge lamp.

4. The ballast circuit of claim 1 wherein said H-bridge further comprises: a resistor electrically connected at said low side of said power source; a capacitor electrically connected with said resistor; and a zener diode electrically connected in parallel with said capacitor.

5. The ballast circuit of claim 1 wherein said regulating circuit further comprises: a resistor connected to a high side of said power source; and a current source connected to said resistor to provide a bias voltage to one of said at least one H-bridge transistor.

6. The ballast circuit of claim 5 further comprising: an element between the low side of the power source and a junction formed between said resistor and said current source so that said element diverts current from said resistor when a voltage supplied by said power source is reduced.

7. The ballast of claim 6 wherein said current source comprises a current source transistor; said at least one H-Bridge transistor is a MOSFET having a gate; and said element is a parasitic capacitor between a base of said current source transistor and an emitter of said current source transistor.

8. The ballast of claim 7 further comprising: a first totem pole transistor having a base and a transmitter; and a second totem pole transistor having a base and an emitter, each said base being connected to said resistor and each said emitter being electrically connected to the gate of said one of said H-bridge transistor.

9. An electronic ballast circuit comprising: a voltage-regulated DC power source; an H-bridge comprising a plurality of H-bridge transistors, said H-bridge being electrically connected to said power source; a lamp socket connected to said H-bridge; and means for controlling at least one of said plurality of H-bridge transistors to limit current through said H-bridge, an igniter transformer mounted in series with a discharge lamp and connected to said H-bridge between said plurality of H-bridge transistors; said plurality of transistors comprising: a first transistor between a low side of said power source and a first terminal of said lamp, a second opposite terminal of said lamp being electrically connected to a first terminal of said igniter transformer, a second transistor between a second terminal of said igniter transformer and the low side of said power source; a third transistor between a high side of said power source and the second terminal of said igniter; a fourth transistor between the high side of said power source and the first terminal of said lamp, said fourth transistor being electrically connected to said means for controlling, said means for controlling including a drive signal output; a bias resistor electrically connected to said high side of said power source; a current source transistor having a base electrically connected to said low side of said power source, a collector electrically connected to said bias resistor and an emitter electrically connected to said drive signal output: a first gate drive transistor and a second gate drive transistor, each having a base connected to said bias resistor; and said fourth transistor being electrically connected to the emitter of said first sate drive transistor, wherein a base and a collector of said current source transistor being connected so that a parasitic capacitance exists therebetween.

10. The ballast circuit of claim 9 wherein said transistors are MOSFETs.

11. The ballast circuit of claim 9 wherein said discharge lamp is a high intensity discharge lamp.

12. The ballast circuit of claim 9 further comprising: a resistor electrically connected at said low side of said H-bridge; a capacitor electrically connected with said resistor; and a zener diode electrically connected in parallel with said capacitor.

13. The ballast circuit of claim 9 wherein said regulating circuit further comprises: a resistor connected to a high side of said power source; a current source connected to said resistor to provide a bias voltage to one of said at least one H-bridge transistor; and an element between the low side of the power source and a junction formed between said resistor and said current source transistor so that said element diverts current from said resistor when a voltage supplied by said power source is reduced and wherein, said current source comprises a transistor; said one of said at least one H-bridge transistor is a MOSFET having a gate; and said element is a parasitic capacitance between a base of said current source transistor and an emitter of said current source transistor.

14. The ballast of claim 13 further comprising: a first totem pole transistor having a base and an emitter; a second totem pole transistor having a base and an emitter, each said base being connected to said resistor and each said emitter being electrically connected to the gate of said one of said at least one transistor.

\* \* \* \* \*